United States Patent
Hoad

[15] 3,670,669
[45] June 20, 1972

[54] PROCESS FOR DISPOSAL OF COMBUSTIBLE WASTE

[72] Inventor: John G. Hoad, Dearborn, Mich.
[73] Assignee: John G. Hoad & Associates, Ypsilanti, Mich.
[22] Filed: Dec. 16, 1970
[21] Appl. No.: 98,559

[52] U.S. Cl. .................. 110/8 R, 110/10, 110/15, 110/119, 122/2
[51] Int. Cl. ......................................... F23g 5/04
[58] Field of Search .................. 110/8, 10, 15, 119; 122/2

[56] References Cited

UNITED STATES PATENTS

| | | | |
|---|---|---|---|
| 3,357,380 | 12/1967 | Siracusa | 110/8 |
| 2,148,447 | 2/1939 | Dundas et al. | 110/15 |
| 2,213,668 | 9/1940 | Dundas et al. | 110/15 |
| 3,525,309 | 8/1970 | Katz | 110/119 X |
| 3,482,533 | 12/1969 | Ankersen | 110/8 |
| 3,159,353 | 12/1964 | Atwater | 110/8 X |
| 3,403,643 | 10/1968 | Denig | 110/15 X |

Primary Examiner—Kenneth W. Sprague
Attorney—Olsen and Stephenson

[57] ABSTRACT

Combustible waste material is collected and processed after which it is disposed of by incineration, the energy derived from combustion being utilized to produce electrical energy. Included in the processing of the waste material are the steps of shredding the waste material, feeding the shredded material through a high density press to separate the dry matter from the liquids, heating the shredded material to drive off additional moisture and gases, fluidizing and feeding the dried shredded material into the incinerator.

14 Claims, 4 Drawing Figures

INVENTOR
JOHN G. HOAD

BY

OLSEN & STEPHENSON
ATTORNEYS

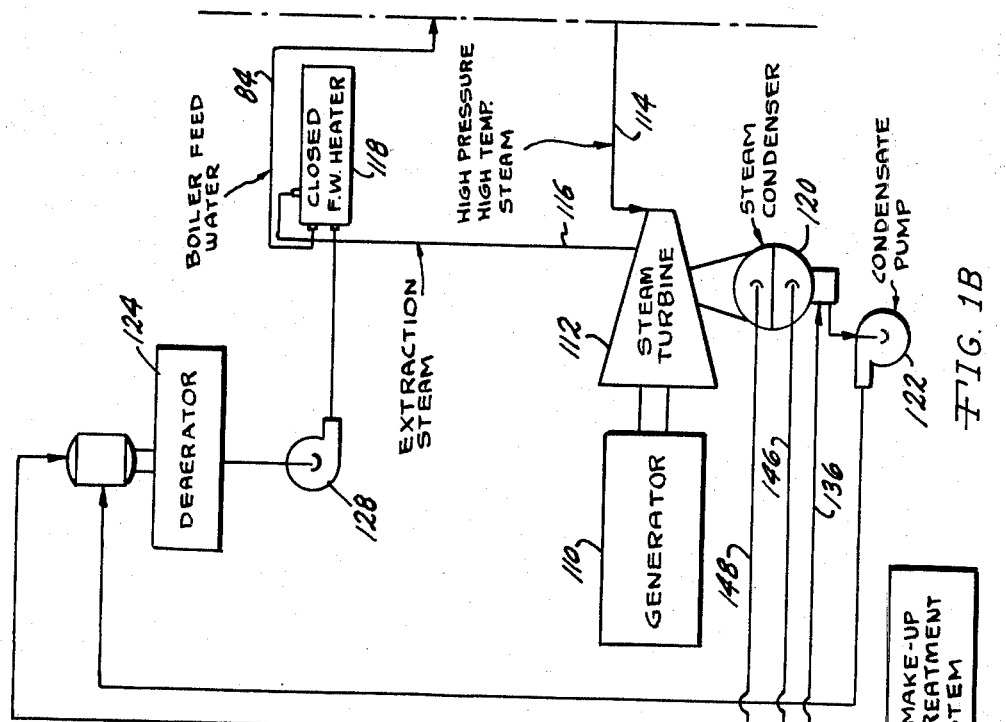
FIG. 1B
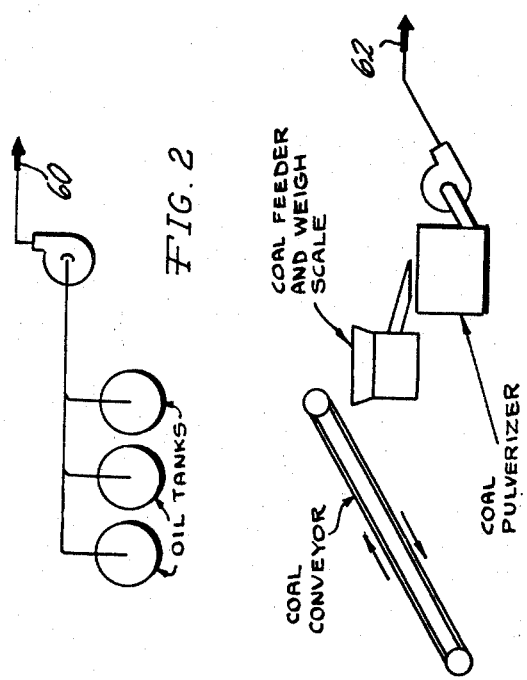
FIG. 2
FIG. 3
INVENTOR
JOHN G. HOAD
BY
OLSEN & STEPHENSON
ATTORNEYS

PROCESS FOR DISPOSAL OF COMBUSTIBLE WASTE

BACKGROUND OF THE INVENTION

The present invention relates to an improved process for solid waste disposal and energy conversion.

It has been conventional practice in the past to use land fill as a solution to solid waste disposal of industrial and municipal wastes, both liquid and solid. This practice is no longer acceptable for numerous apparent reasons. The alternate practice for volume reduction of solid waste at the present time is by incineration. The existing practices where incineration is employed leave much to be desired for economic reasons and because inadequate steps have been taken to prevent pollution of the environment.

SUMMARY OF THE INVENTION

The present invention provides an improved process for disposing of solid waste wherein the solid waste is processed so that optimum incineration of the solid matter and the malodorous gases is realized, and the processing of the solid matter is such that it can be efficiently utilized during incineration to supply heat energy for the production of electricity, thus realizing an economic return from the incineration operation. The operation is also carried out by steps which minimize thermal and smoke pollution of the atmosphere.

According to one form of the present invention, a process is provided for disposal of combustible solid waste and for conservation of energy comprising the steps of conveying combustible solid waste from a collection enclosure to a shredder and shredding the solid waste to obtain shredded material of a uniform maximum size. The shredded material is then compressed in a high density press to separate liquids from the dry material, and the dry shredded material is then directed to a heating chamber and heated to drive off additional moisture and gases. The dried shredded material is then deposited in a storage chamber from which it can be removed and fluidized and thereafter fed into a suspension burning furnace where it is incinerated. Auxiliary fuels are also introduced into the furnace to supplement the combustion of the fluidized material and to control the temperature within the furnace. Vent gases from the collection enclosure and from the storage chamber as well as the moisture and gases from the heating chamber are returned to the furnace and are incinerated together with the fluidized material, thereby assuring that malodorous gases are prevented from polluting the atmosphere.

Steps are also provided to remove from the stack gases any soot or dry matter entrained therein, and such dry matter is then transferred together with ash residue from the furnace to a land fill or other suitable destination.

The furnace also is utilized to provide heat for a steam boiler and superheater which is part of an electric generator plant which utilizes steam turbines for operating the electrical generators. The boiler superheater supplies high pressure, high temperature steam to operate the steam turbines so that the heat energy derived from incinerating the waste material is utilized to produce electrical energy, thereby enabling an economic return to be realized from carrying out the incineration operation.

Accordingly, it is an object of the present invention to provide an improved solid waste disposal system.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIGS. 1A and 1B are a schematic diagram illustrating an arrangement suitable for carrying out the method of the present invention;

FIG. 2 shows schematically a modified arrangement for supplying auxiliary fuel to the furnace; and FIG. 3 shows still another modified arrangement for supplying auxiliary fuels to the furnace.

DESCRIPTION OF THE PREFERRED EMBODIMENTS

Figure 1A:
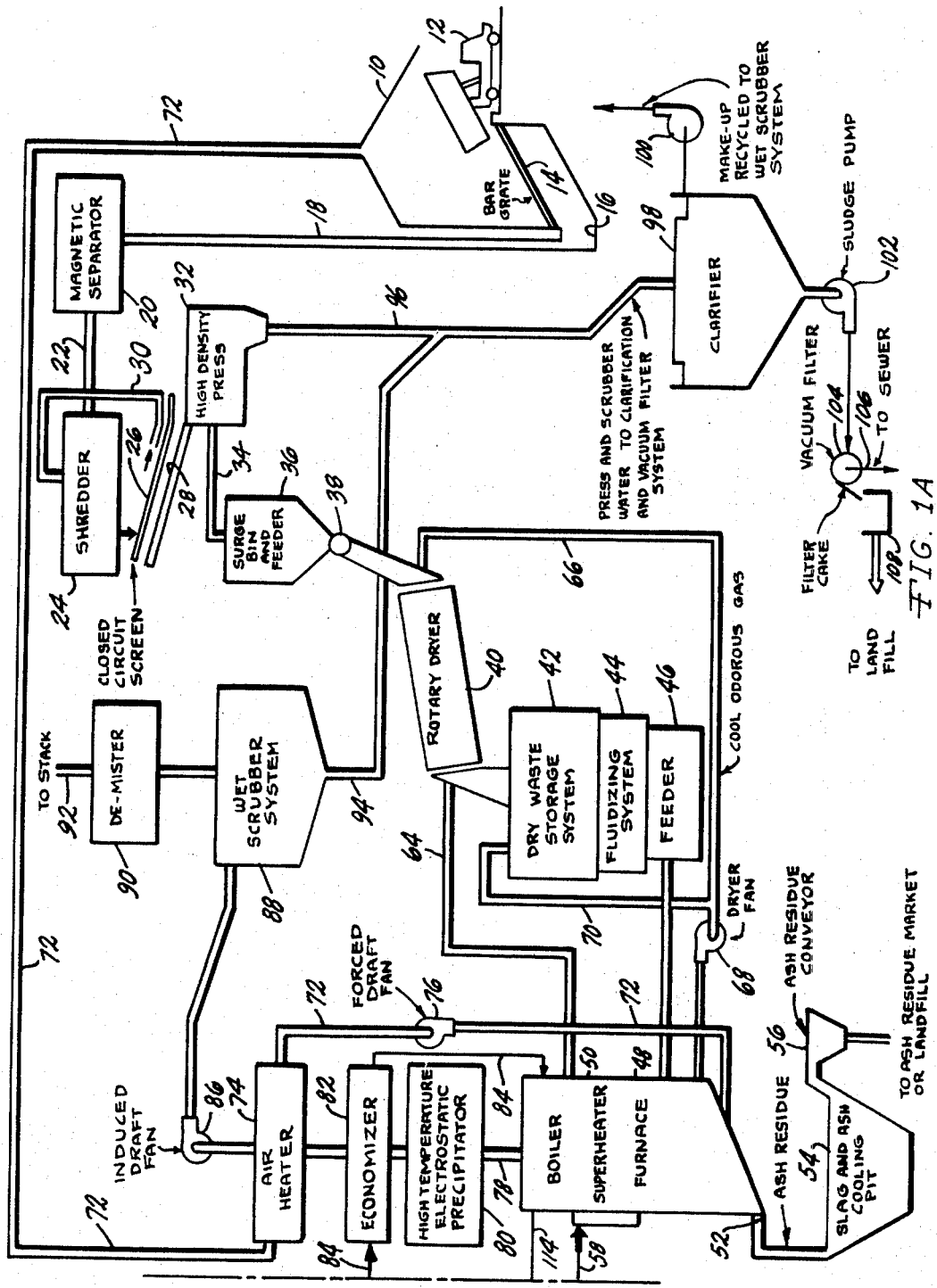

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, apparatus schematically shown for carrying out the method of the present invention will be described. With reference first to FIG. 1A, a ventilated collection enclosure 10 is shown which is adapted to receive from collection trucks 12, or the like, a variety of solid waste materials which may be industrial or municipal wastes, both moist and dry. The wastes will be deposited initially upon a bar grate 14 for separating any large metallic or non-combustible materials while permitting the remaining combustible and wet materials to descend through the bar grate to the sump portion 16 from which it can be transmitted by means of suitable conveying apparatus through a passage 18 to a magnetic separator 20 for separating magnetic particles. After having been processed through the magnetic separator 20 the combustible solid waste material is conveyed through the passageway 22 to a shredder 24 where the solid waste material is shredded to obtain shredded material of a uniform maximum size. The shredded material is deposited on a closed circuit screen 26 through which the shredded material of the uniform maximum size can pass onto a conveyor 28, and any shredded material which is above the desired maximum size will be recycled via the passageway 30 to the shredder for reshredding to assure that material of the maximum size only is passed onto the conveyor 28 to the high density press 32.

The high density press 32 can be any suitable press, such as of the type used in the paper pulp industry, wherein liquids can be separated from the dry matter of the shredded material. The relatively dry shredded and pressed material is then passed via suitable conveying means 34 to a surge bin and feeder 36. The latter has a feed mechanism 38 at its outlet for feeding the shredded and pressed material at a controlled rate into a rotary drier or heating chamber 40. After being dried in the rotary drier or heating chamber 40, the dried shredded material is deposited in the storage chamber or dry waste storage system 42 which is operatively associated with the fluidizing system 44. The fluidizing system 44 is adapted to receive dry shredded material from the chamber 42 and to fluidize it by means of a suitable aeration system and then to feed the fluidized dry shredded material via the feeder 46 into a suspension burning furnace 48 where it can be incinerated.

The furnace 48 has in its upper regions a boiler superheater apparatus 50 for use in the generation of electricity, as will be described. In its lower regions the furnace has an outlet 52 for discharge of ash residue to a slag and ash cooling pit 54. Associated with the latter is an ash residue conveyor 56 which may be used to discharge the ash residue to a suitable conveying means for transportation to a land fill operation or an ash residue market.

Auxiliary fuel is supplied to the furnace 48 by conventional fuel supply means 58, the source of fuel in the illustrated embodiment being a natural gas which is used to supplement the combustible material that is discharged into the furnace by the feeder 46. The auxiliary fuel supply means 58 is provided to stabilize the combustion conditions within the furnace 48 and to aid in regulating the temperature for operation of the boiler and superheater. As shown in FIGS. 2 and 3, other sources of auxiliary fuels may be used. Thus, as shown in FIG. 2, fuel oil may be discharged at supply means 60 into the furnace in place of the natural gas, or if desired, pulverized coal can be used and can be discharged at supply means 62 into the furnace, as is illustrated in the embodiment shown in FIG. 3.

The furnace 48 is also provided with an outlet adjacent to its upper end from which a portion of the hot gases can be directed via the passage way 64 to the rotary drier or heating chamber 40 for passing in heat transfer relation to the shredded material delivered thereinto by the feed mechanism 38. The hot gases preferably will make direct contact with the shredded material and will drive off additional moisture and gases and such moisture and gases together with the partially cooled hot gases will pass via the conduit 66 to a fan 68 which will discharge these malodorous gases and moisture into the furnace 48 at a location below the hottest region of the furnace. Also, vent gases from the storage chamber 42 will be discharged therefrom via the conduit 70 through the fan 68 to the furnace 48, and these gases together with those discharged via the conduit 66 will be incinerated together with the shredded dry material fed through the feeder 46 into the furnace 48. Also directed into the furnace 48 for incineration are the malodorous gases or ventilation gases which are collected at the ventilated collection enclosure 10 and which are discharged therefrom via the conduit 72, the heater 74 and the forced draft fan 76 to the lower regions of the furnace 48. Thus, it can be seen that all of the dry matter and gases which are combustible are incinerated in the furnace 48.

The exhaust gases which are discharged from the furnace 48 are treated to assure that pollution of the environment is essentially eliminated. To accomplish this purpose the exhaust gases are discharged at 78 and are directed through a high temperature electrostatic procipitator 80 after which they are passed through the economizer or heat exchange unit 82 for preheating boiler feed water being conveyed via the conduit 84 to the boiler superheater apparatus 50. The exhaust gases then pass through the air heater or heat exchanger 74 for preheating the ventilation gases flowing from the enclosure 10 via the conduit 72 to the furnace 48. The exhaust gases then pass through the induced draft fan 86 to a wet scrubber system 88 and relatively cool clean gases are then discharged through the de-mister 90 to the stack at 92. Thus, the exhaust gases which are discharged to atmosphere will be free of smoke particles and obnoxious gases which otherwise would pollute the atmosphere.

Both the wet scrubber system 88 and the high density press 32 discharge liquids which must be disposed of without creating pollution problems. For this purpose the liquid from the wet scrubber system 88 is discharged via the conduit 94 and the liquid from the high density press 32 is discharged via the conduit 96 to the clarifier 98. The effluent from the clarifier is then returned via the pump 100 to the wet scrubber system 88, and a sludge pump 102 removes the sludge from the clarifier and delivers it to the vacuum filter 104. The liquids which are removed at the vacuum filter are discharged to the sewer at 106, and filter cakes are discharged therefrom to a receptacle 108 for discharge to a land fill, or the like.

Referring now to FIG. 1B, a brief description will be given of the electric generator plant that is operated in conjunction with the waste disposal system. One or more electric generators 110 are provided which are adapted to be driven by one or more steam turbines 112. The latter receive high pressure, high temperature steam via the conduit 114 from the superheater located in association with the furnace 48. Extraction steam from the steam turbine 112 is provided for flow through the conduit 116 to the closed feed water heater 118 whereby the boiler feed water flowing through the conduit 84 is preheated. The exhaust steam from the steam turbine will flow through the steam condenser 120 and will be recirculated by the condensate pump 122 to the de-aerator 124 via conduit 126, and by the pump 128 to the conduit 84 after passing through the feed water heater 118. The water supply main 130 will provide water to the boiler make-up water treatment system 132 whereby boiler make-up water is available via conduit 134 and conduit 136. Emergency make-up can be supplied via the conduit 138 to the de-aerator system 134.

The water supply main 130 also is available to supply cooling water make-up via conduit 140 to the tank 141 at the base of the cooling water tower 142. Cooling water to the condenser 120 is provided from the tank 141 via the cooling water pump 144 to the steam condenser 120 through conduits 146 and 148 for return to the cooling tower. Chemical treatment for the cooling water is provided at a cooling water chemical treatment system 150 for deposit into the tank 141.

The waste handling system from the enclosure 10 to the dryer 40 is for wet waste. A separate and similar system to the dryer 40, but without the high density press 32, is provided for relatively dry waste. The dry waste handling apparatus to the dryer 40 is not shown, but it is to be understood that it may be constructed the same as that associated with the waste handling apparatus for the wet waste, except merely omitting the high density press 32.

From the foregoing description it will be apparent that a waste handling system has been provided for disposing of large quantities of combustible waste wherein the waste is treated so as to be usable continuously as a source of heat energy for operation of an electric generator system. The electric generator system is arranged so that auxiliary fuel is readily available to supplement the processed waste material as fuel to the furnace whereby the incineration operation will function in a manner to assure economical and proper operation of the steam producing facilities and thereby the electric generator plant and also to assure that complete incineration of the waste materials and gases is realized.

Further, the waste handling system is such that it will not pollute the environment either thermally or by discharge of smoke and the like into the atmosphere. The only dry matter that is left for disposal is the ash residue from the furnace and sludge from the clarifier, and these materials can be suitably disposed of without polluting the environment.

It is claimed:

1. A process for disposal of combustible solid waste deposited in an enclosure comprising the steps of ventilating said enclosure, shredding the solid waste to obtain shredded material of a uniform maximum size, feeding the shredded material through a high density press and compressing the same to remove liquids from the material, heating the shredded material to drive off additional moisture and gases to provide dried shredded material, fluidizing and feeding the dried shredded material into a suspension burning furnace and incinerating such fluidized material, and discharging gases from the ventilated enclosure into said suspension burning furnace.

2. The process that is defined in claim 1, wherein said additional moisture and gases are collected and introduced into said furnace below the point of highest temperature.

3. The process that is defined in claim 2, wherein a portion of the hot gases from said furnace are passed in heat transfer relation to said shredded material for heating the same to drive off the additional moisture and gases.

4. The process that is defined in claim 3, wherein after passing in heat transfer relation to said shredded material, said portion of the hot gases is returned to the combustion chamber of said furnace.

5. The process that is defined in claim 1, which includes the step of passing the ventilation gases in heat transfer relation to the exhaust gases from said furnace before the ventilation gases are discharged into said furnace.

6. The process that is defined in claim 1, which includes the steps of passing the exhaust gases from said furnace through a wet scrubber system before discharge to atmosphere, discharging the scrubber water to a clarifier, discharging said liquids removed from the shredded material to the clarifier, and returning the effluent from the clarifier to said wet scrubber system.

7. The process that is defined in claim 1, wherein the hot gases from said furnace are passed initially in heat transfer relation to a boiler superheater in which high pressure and high temperature steam is produced for use in generating electrical energy, and auxiliary fuels are introduced into said furnace to supplement the combustion of said fluidized material and to control the temperature within the furnace.

8. The process that is defined in claim 7, wherein the exhaust gases from said furnace are passed in sequence in heat transfer relation to boiler feed water for said superheater and to said ventilation gases prior to the latter being discharged into said furnace.

9. The process that is defined in claim 8, wherein said exhaust gases from the furnace are then passed through a wet scrubber system before discharge to the atmosphere, the scrubber water is discharged to a clarifier, the liquids removed from the shredded material also are discharged to said clarifier, and the effluent from the clarifier is returned to said wet scrubber system.

10. A process for disposal of combustible solid waste and for conservation of energy comprising the steps of conveying combustible solid waste from a collection enclosure to a shredder and shredding the solid waste to obtain shredded material of a uniform maximum size, compressing the shredded material to remove liquids from the material, directing the shredded material into a heating chamber and heating the material to drive off additional moisture and gases and depositing such dried shredded material in a storage chamber, fluidizing the dried shredded material from the storage chamber and feeding the fluidized material into a suspension burning furnace and incinerating such fluidized material, and simultaneously directing vent gases from the collection enclosure and from the storage chamber and moisture and gases from the heating chamber into said furnace and incinerating the same.

11. The process that is defined in claim 10, wherein the hot gases from said furnace are passed in heat transfer relation to a boiler superheater in which high pressure and high temperature steam is produced for use in generating electrical energy.

12. The process that is defined in claim 11, wherein auxiliary fuels are introduced into said furnace to supplement the combustion of said fluidized material.

13. The process that is defined in claim 12, wherein a portion of the hot gases from said furnace are passed through said heating chamber in contact with the shredded material for heating the latter, and said portion of the hot gases is returned with said additional moisture and gases into said furnace.

14. A process for disposal of combustible solid waste comprising the steps of depositing said combustible solid waste material in an enclosure, ventilating said enclosure, shredding the solid waste to obtain shredded material of a uniform maximum size, feeding the shredded material through a high density press and compressing the same to remove liquids from the material, heating the shredded material to drive off additional moisture and gases to provide dried shredded material, fluidizing and feeding the dried shredded material into a suspension burning furnace and incinerating such fluidized material, and treating the vent gases from said enclosure before discharge to atmosphere to prevent malodorous gases from polluting the atmosphere.

* * * * *